United States Patent [19]

Pilant

[11] 4,133,577
[45] Jan. 9, 1979

[54] BOAT TRAILER CONVERTIBLE TO TENT SHELTER

[76] Inventor: Thomas M. Pilant, 1247 E. Lincoln, Birmingham, Mich. 48008

[21] Appl. No.: 722,808

[22] Filed: Sep. 13, 1976

[51] Int. Cl.$^2$ .............................................. B60P 3/34
[52] U.S. Cl. ................................. 296/23 B; 214/1 A; 9/1.2; 280/414 R
[58] Field of Search .................. 296/23 B; 280/414 R; 214/1 A; 9/1.2

[56] References Cited

U.S. PATENT DOCUMENTS

| | | | |
|---|---|---|---|
| 3,604,747 | 9/1971 | Gorman | 296/23 B |
| 3,685,476 | 8/1972 | Routery | 214/1 A |
| 3,831,208 | 8/1974 | Smith | 296/23 B |
| 3,870,339 | 3/1975 | Goff | 280/414 R |
| 3,885,693 | 5/1975 | Haptonstall | 296/23 B |

FOREIGN PATENT DOCUMENTS 552158  1/1958  Canada .............................. 280/414 R

*Primary Examiner*—Richard A. Bertsch
*Attorney, Agent, or Firm*—Krass & Young

[57] ABSTRACT

A trailer arrangement is disclosed providing support for a pair of sail boat hulls which are positioned on the trailer in a partially inverted position tipped inwardly against an A-frame central storage enclosure, which enclosure has inclined sides to each of which are affixed a pair of hull rests adapted to receive the boat hulls. The boat hulls are retained in position therein by a series of clamp arms which are pivotally supported so as to swing into engagement with the hull bottom surfaces and having extensions pivotally connected thereto at the outer ends and which are interlocked with each other to secure the clamp arms in engagement with the boat hulls. The clamp arms and extensions also provide a rigging platform for the boats during unloading operations when supported on the ground surface, the extension arms acting to support the clamp arms horizontally when vertically positioned, and allowing the clamp arms to function as ramp skids when the extensions are pivoted out of engagement with the ground surface. A storage system is also included in the trailer arrangement consisting of the central storage structure and additionally an overhead boom and mast compartment extending along the upper surface of the storage compartment forwardly and parallel with the trailer draw bar member. Also disclosed is an arrangement for utilizing the trailer structure as a framework for a two compartment tent shelter erectable thereon in which the clamp arms supported by the extension arms provides support for an above ground tent floor while the boom and mast storage compartment provides a support for the tent peak.

19 Claims, 5 Drawing Figures

Fig-2

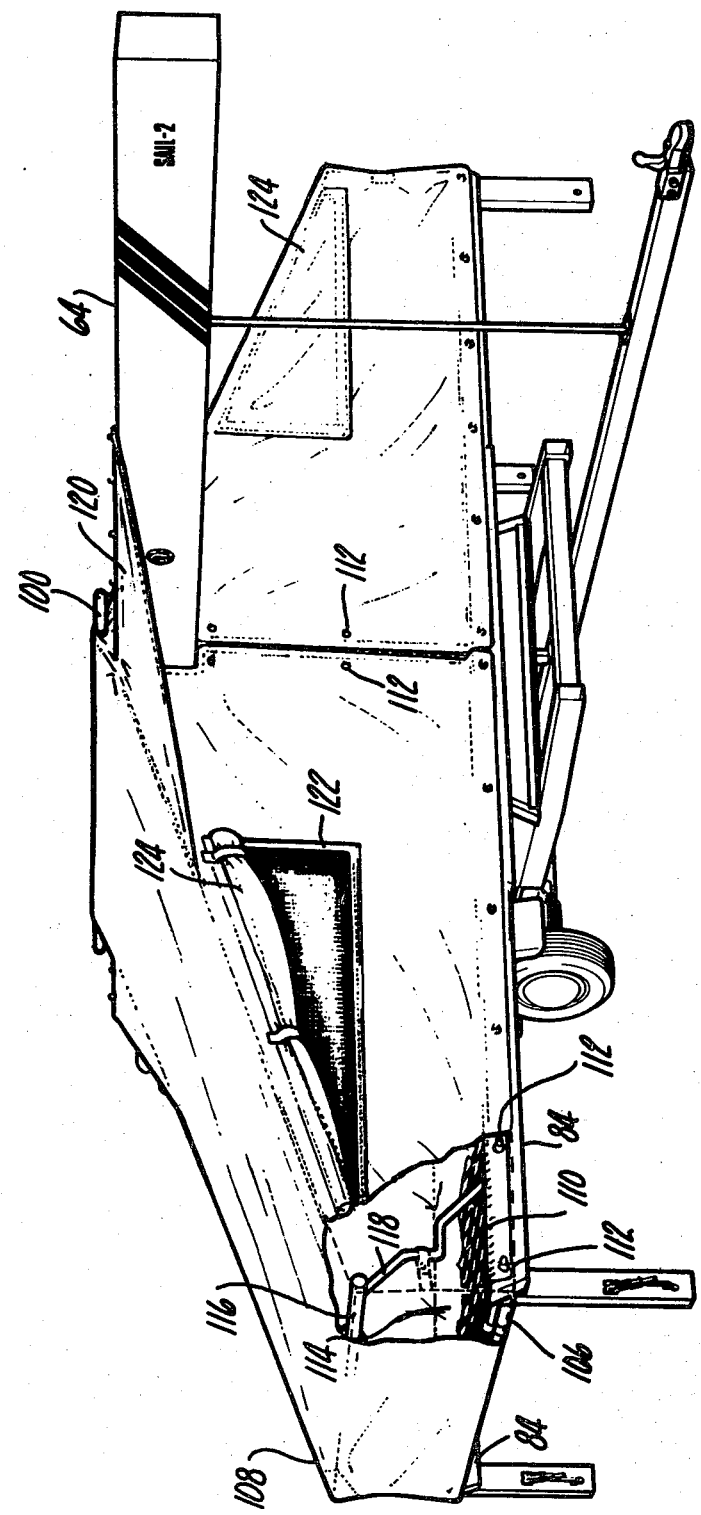

BOAT TRAILER CONVERTIBLE TO TENT SHELTER

BACKGROUND OF THE INVENTION

1. Field of the Invention

This invention concerns boat trailer arrangements and more particularly boat trailer arrangements which are adapted to accommodate sail boat pairs.

2. Description of the Prior Art

Many forms of modern recreation such as motorcycle touring, bicycle riding, snowmobiling, etc. have become family or couple oriented and have accordingly required the use of transport or trailer arrangements which are capable of accommodating two or more items of the equipment involved, i.e. motorcycles, snowmobiles, etc. Sailing of smaller or personal sized sailboats would seem similarly adapted to such participation patterns, which would render desirable a boat-trailer capability for trasporting two or more sail boats. Trailer arrangements heretofore for a plurality of boats have generally involved rack-like structures in which boat pairs are positioned side by side and, in some instances, stacked. This stacked approach is generally used to transport canoes or other easily handled craft, and when this approach is applied to sailing craft of the size and type contemplated would suffer from the disadvantage of the relative difficulty in launching such craft is experienced, inasmuch as their weight is usually excessive for such handling by one person. A further disadvantage of these arrangements is the relatively great aerodynamic resistance of the hulls inasmuch as there is no attempt to streamline the boat and trailer assemblage.

In the context of sail boats, the storage of the various items of rigging such as the sails, masts, booms, spars, etc. can present a considerable inconvenience and successful handling of this detail can contribute in no small part to the relative enjoyment of the sport since the packing and unpacking of the rigging can be an annoying chore if suitable stowage systems are not provided. Prior art boat trailers have in the past not entirely solved this problem.

Finally, the participation in such sports is commonly carried out in resort areas remote from the home of the boater in which cases it would be highly desirable to provide such trailers with tent conversion capabilities as has been done in the past with other trailer arrangements.

Accordingly, it is an object of the present invention to provide a boat trailer arrangement in which a pair of boats may be accommodated in such a manner as to minimize the handling of the boat required in carrying out a launching operation.

It is another object of the present invention to provide such a boat trailer in which a very organized and convenient storage arrangement is included.

It is yet another object of the present invention to provide such a trailer arrangement in which the boat hulls are positioned so as to utilize the potential aerodynamic efficiency of the boat hulls to facilitate transport with a minimum of aerodynamic resistance.

It is another object of the present invention to provide such a trailer arrangement which has a tent conversion capability.

SUMMARY OF THE INVENTION

These and other objects of the invention which will become apparent upon a reading of the following specification and claims is accomplished by a trailer arrangement in which a pair of boat hulls are mounted on a trailer frame side by side, in a partially inverted position, inclined against a central A-frame storage enclosure to which are affixed boat hull rests positioned so that boat hulls disposed therein are tipped inwardly towards each other and retained in this position by a series of clamp arms pivotally mounted so as to swing into engagement with the bottom of the boat hulls. The clamp arms have extension portions at the outer extremity thereof adapted to swing into an overlapping engagement with an opposing clamp arm extension, adapted to be interlocked together to securely retain the hulls on the trailer. The clamp arms are also adapted to swing downwardly into a horizontal position to be supported above the ground by the extension so as to provide a support platform for the respective boat hulls during rigging and are also adapted to be lowered to the ground to provide a launching ramp during lauching operations. The central storage enclosure it supplemented by an elongated mast and boom compartment extending forwardly parallel and over the trailer draw bar member.

The clamp arms, when in the horizontal position supported above the ground adjacent the boat trailer, are also adapted to provide a tent floor support frame while the boom and mast compartment provides a support for the tent peak for a tent enclosure adapted to be secured to the boat trailer structure.

BRIEF DESCRIPTION OF THE DRAWINGS

FIG. 2 is a perspective view of the trailer and boats shown in FIG. 1 with the boats lowered to the rigging position;

FIG. 5 is a front perspective view of the trailer arrangement depicted in FIGS. 1-3 with a tent enclosure installed thereon.

DETAILED DESCRIPTION

In the following specification a particular embodiment of a boat trailer arrangement according to the present invention will be described in specific terms but it is to be understood that this specificity is not intended to be limiting but rather the invention is susceptible of many variations within the scope of the concept.

Figure 1:
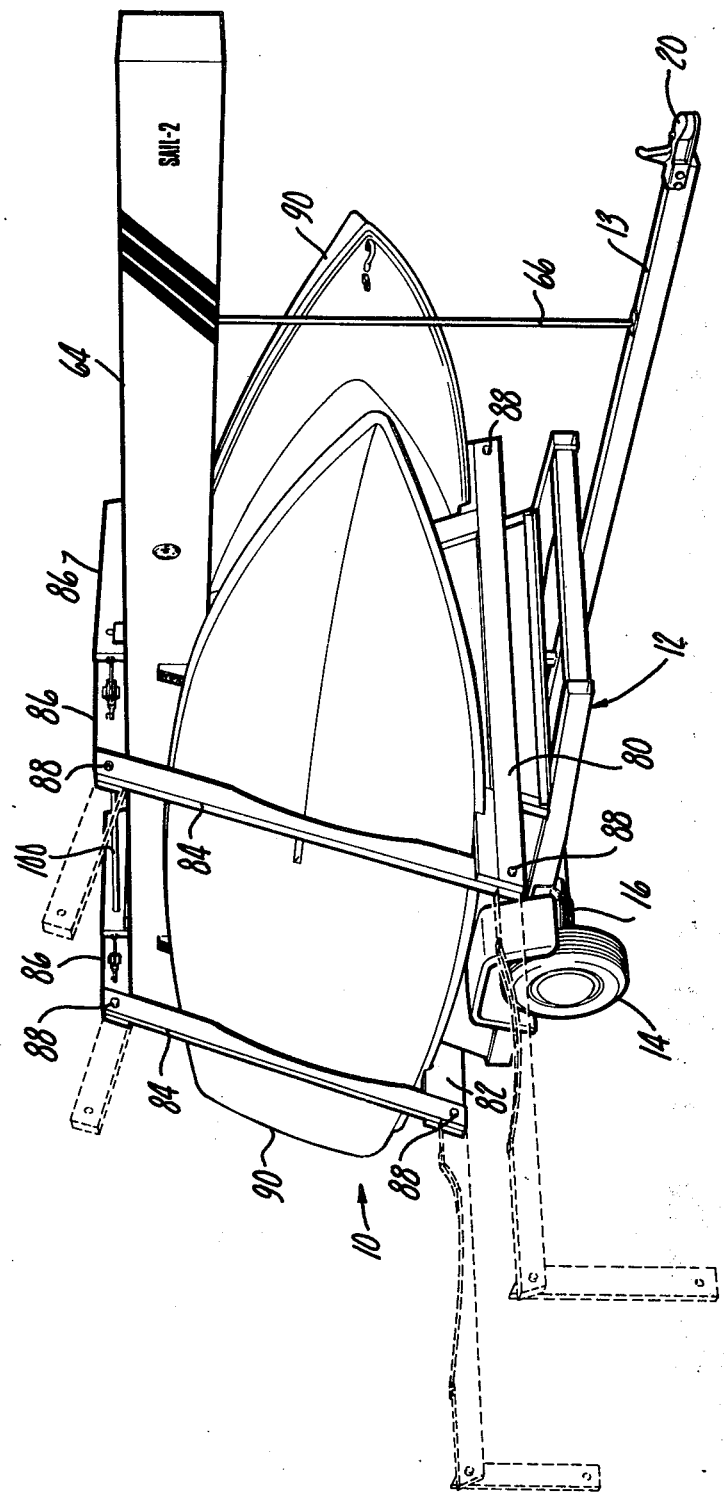
FIG. 1 is a perspective view of a trailer according to the present invention shown with the boat hulls in the stowed position.
Figure 2:
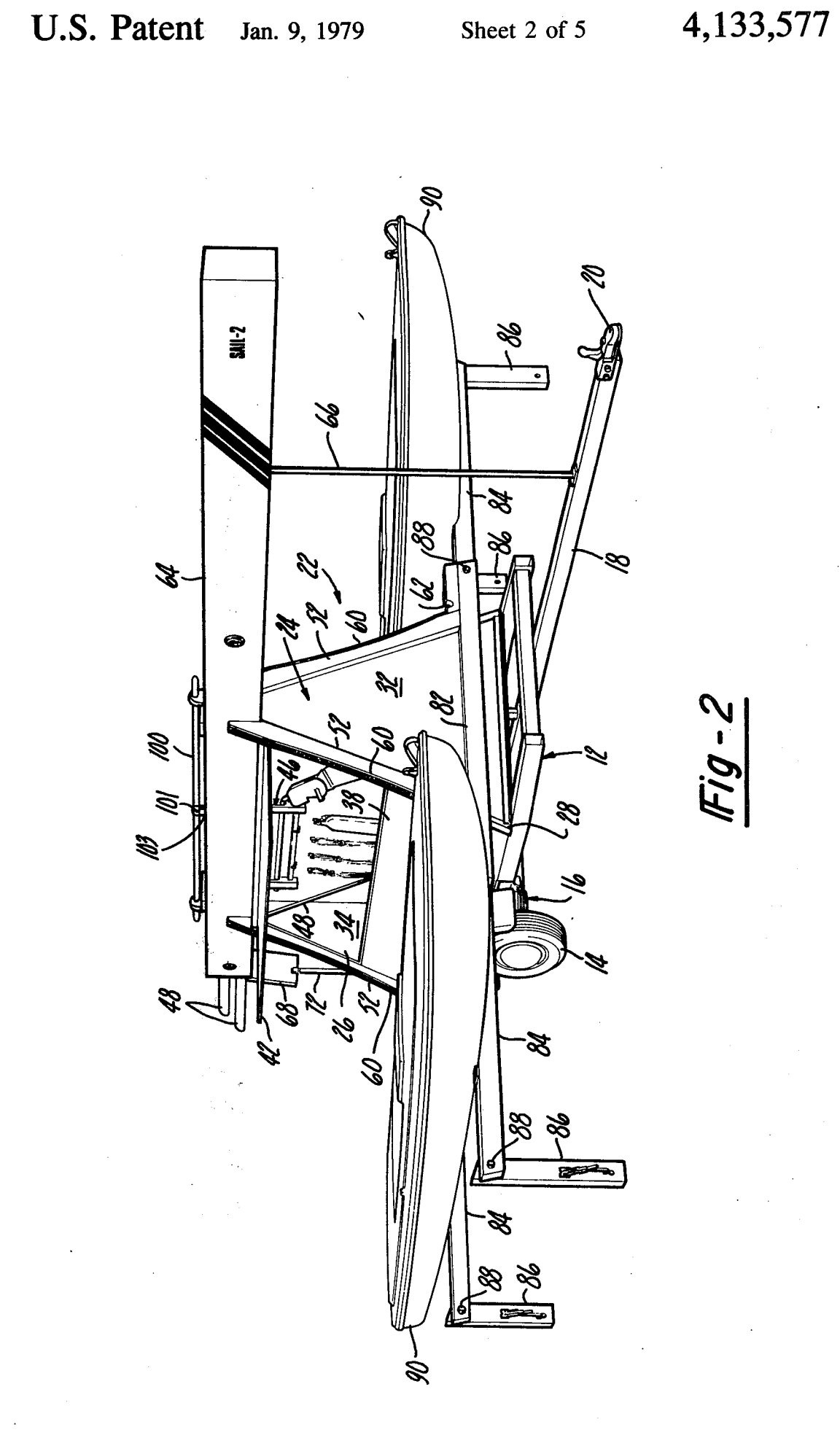
Figure 3:
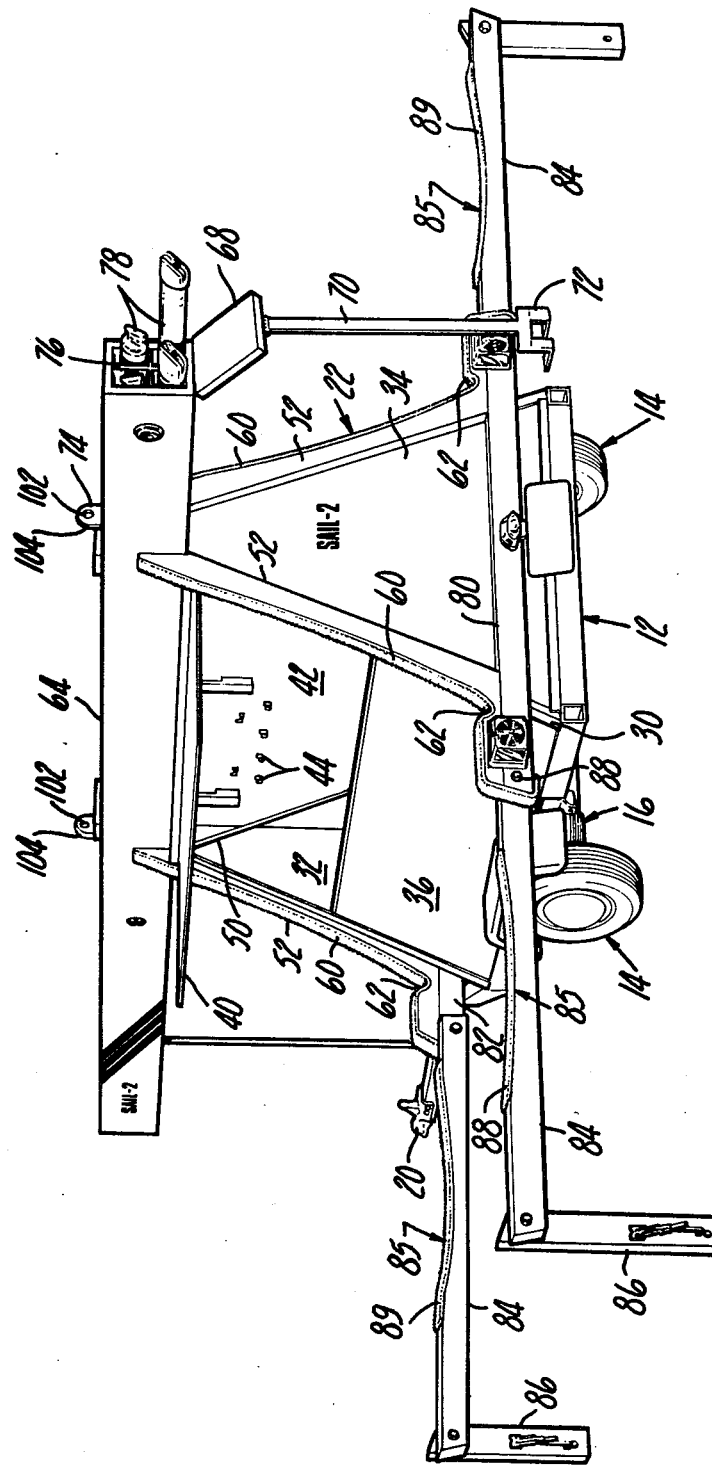
FIG. 3 is a rear perspective of the trailer arrangement shown in FIGS. 1 and 2 with the boat hulls removed.

Referring to the drawings and particularly FIGS. 1-3, the trailer arrangement is designated generally by the reference numeral 10 and includes a trailer frame 12 comprised of welded steel members which are supported so as to be able to be towed by a towing vehicle (not shown) which support is provided by a pair of road engaging wheels 14, springs 16, and an axle assembly (not shown). A draw bar member 18 adapted to be coupled to the towing vehicle by means of the coupling 20 is also provided in the conventional manner. Supported on the frame 12 is a centrally located A-frame storage enclosure 22 formed by a pair of end sections 24 and 26 fabricated of angle iron frames 28 and 30 respectively secured to the trailer frame 12 and having panel sections 32 and 34 disposed within the frames 28 and 30. Panel sections 36 and 38 secured to each end sections 24 and 26 close the lower portion of the storage enclosure 22 while hinged panel doors 40 and 42 are also provided to provide access to the interior of the storage enclosure 22. A central partition 43 can also be provided to allow mounting clips 44, or to support various mounting frames such as a tiller and rudder frame 46. Prop poles 48 and 50 would also advantageously be provided in order to allow positioning of the panel doors 40 and 42 in the open position. A floor panel (not shown) would also be provided to prevent dust and puddle splash, etc. from reaching the interior of the storage enclosure 22.

Secured to the inclined sides of the storage enclosure 22 are a series of inwardly inclined boat hull rests 52 having an outer contour shaped to receive the upper surface of the boat hulls 90 positioned side by side thereon in a partially inverted position and having protective strips of a cushioning material such as carpet strips 60 affixed thereto. At the lower portion of each boat hull rest 52 is a hull retaining notch 62 into which the protective strips 60 extend.

Secured to the upper portion of the A-frame storage enclosure 22 and extending along the longitudinal axis of the trailer 10 is a boom and mast storage enclosure 64 consisting of an elongated box which extends forwardly of the storage enclosure 22 parallel to the draw bar 18 with a supporting strut 66 provided to brace the cantilevered portion thereof. At the rear of the boom and mast enclosure 64 an access door 68 is provided which may be secured in the closed position by means of a strap 70 and retainer clip 72 adapted to engage an upper bracket 74. The boom and mast storage enclosure 64 may advantageously be compartmentalized by means of partitions 76 to facilitate insertion and removal of the mast, boom and spar members, designated generally as 78, as shown in FIG. 3.

Mounted on a pair of cross members 80 and 82 affixed to the central storage enclosure 22 are a series of clamp arms 84, comprised of spaced apart pairs disposed on either side of the trailer longitudinal axis each having contoured sections 85 which are lined with carpeting strips 89 and are adapted to be pivoted into engagement with the bottoms of the boat hulls as shown in FIG. 1 by virtue of pivotal connections 87. The clamp arms 84 are adapted to be releasably retained in engagement with the bottom of the boat hulls by a pair of clamp arm extensions 86 pivotally mounted to the free ends of the clamp arms 84 pivoted at 88 so as to be capable of extending inwardly across the upper surface of the storage compartment 64 and into overlapping relation with an opposing extension so as to securely enfold the respective boat hulls 90.

Figure 4:
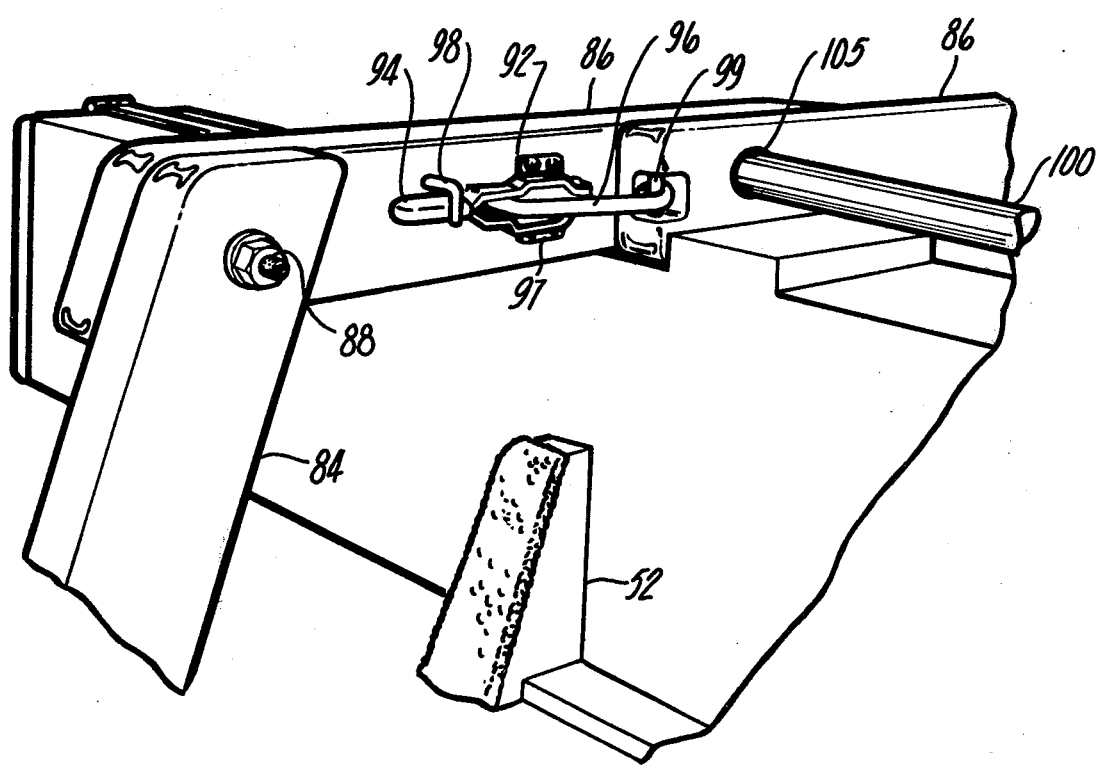
FIG. 4 is a perspective enlarged view of the locking mechanism used to secure the clamp arm extensions.

The clamp arm extensions 86 are secured in their overlapping position by means of a locking device 92 comprised of a toggle arm 94 pivotally connected to one of the clamp arm extensions 86 and a hook 96 pivotally mounted to a clevis 97 integral with the toggle arm 94 and adapted to be hooked over a pin 99 secured to the opposite overlapped clamp arm extension 86 as shown in FIG. 4. The hook 96 engaing the toggle arm clevis 97 and pin 99 such that the boat hulls 90 may be drawn securely against the boat hull rest 52 with a retainer hook 98 provided to secure the toggle arm 94 in the locked position as shown.

A safety interlock is also provided by a safety locking pole 100 passing through apertures 102 and 104 and through similar apertures 105 formed in the clamp arm extension members 86. The locking pole 100 has a suitable locking eye 101 secured to its midportion so as to be able to be locked to a bracket 103, thus providing an anti-theft precaution as well as a safety precaution against inadvertent release of the interlock mechanisms 92.

As shown in phantom in FIG. 1 and in solid in FIG. 2, the clamp arm extension members 86 are adapted to support the clamp arms 84 in a substantially horizontal position above the ground surface adjacent the trailer for convenience in rigging the boat hull and accordingly are of suitable length as to correspond to the height of the cross members 80 and 82 above the ground.

In use the trailer 10 would retain the boat hulls 90 side by side, tilted inwardly in a partially inverted position as shown in FIG. 1 during transport with the locking mechanisms 92 and safety locking poles 100 in position as shown. It can be seen that the inward tilt of the boat hulls 90 in such that their weight tends to remain them in the position against the boat hull rests 52. Thus, upon reaching the launching site, the locking mechanism 92 and locking poles 100 could be released, the clamp arms 84 swung down and the clamp arm extensions 86 positioned to support the same in the horizontal position as shown in phantom in FIG. 1, prior to moving the boat hulls 90 away from the boat hull rests 52. After so positioning the clamp arm 84 the boat hulls can then be manually pulled outwardly to be lowered into position on the clamp arms 84. The mast, booms, etc. may then be withdrawn from the storage compartment 64 as can be the various items of rigging and stowage from the interior of the A-frame enclosure 22 and the boat rigged in this position. Most advantageously the trailer 10 would have been positioned with its longitudinal axis thereof normal to the water's edge and adjacent thereto such that upon completion of the rigging operations the rearmost clamp arm extensions 86 may be kicked out to lower the rearmost clamp arms 84 allowing a launching of the rigged boat such that the boat need not be hoisted or lifted in order to launch the same, thus allowing one-man launching operations. Upon bringing the boat in the same procedure could be used in reverse, i.e. the clamp arms 84 would be lowered to provide a ramping skid surface such that the boat can be slid up with the clamp arms 84 then each lifted and the clamp arm extensions 86 positioned to maintain the boat in the raised position with the various items of rigging and the booms, masts, and then removed and stored in the appropriate locations in the A-frame storage enclosure 22 or the storage enclosure 64. The boat hulls would then be tipped over into position in the hull rests, after which the clamp arms 84 would be raised and moved into engagement with the bottom of the boat hull 90 and the clamp arm extensions 86 placed in overlapping relationship and the locking mechanisms 92 engaged and the locking pole 100 placed in position.

It may be seen that a very streamlined profile is produced in which the favorable aerodynamic lines of the bottom of the boat hulls are taken advantage of and the cockpit openings thereof closed off by means of the A-frame enclosure 22 such that it has been found that aerodynamic resistance to towing of the loaded trailer is minimal. It may also be seen that the launching and loading procedure is extremely organized and efficient and allows a step-by-step stowage and unstowage of the items of rigging with the boat hull advantageously disposed for these operations such that the operation becomes extremely simple and efficient. It can also be seen that the stowage for the hulls themselves is extremely secure and is also such that theft would be discouraged.

Referring to FIG. 5 the adaptation of the trailer 10 to receive a tent shelter is shown. This includes the addition of a cross strut member 106 to position laterally each of the respective pairs of clamp arms 84 disposed on the same side of the trailer passing through a bottom loop of a tent enclosure 108. A floor support is provided by a criss-cross pattern of nylon cording 110 which may be secured to the clamp arms 84 by looping over support pins 112 spaced along the length of the clamp arms 84. A doubled loop formed along the tent floor and tent sides 114 would similarly be looped over the support pins 112 by the provision of mating grommets to secure the tent thereto. An upper cross pole 116 would be positioned to form the upper wall edge of the tent enclosure and secured in position by a pair of struts 118. The tent 108 is supported at the peak by a locking pole 100 passing through corresponding openings in the peak of the tent enclosure 108. Overhang sections 120 could also be provided secured to the enclosure 64 top surface as shown, while the central seam portion could be lapped on retainer pins 112 secured to the end sections of the A-frame enclosure 22. Screened openings 122 could be provided with weather cover 124 as could other features of conventional tent construction.

According it can be seen that the objects of the present invention have been provided by the trailer arrangement described, i.e. a trailer configuration adapted to accomodate two boats has been provided which is very advantageously adapted to stowage of sail boats. This arrangement does not require hoisting of the boat hulls in order to launch or to place in a rigging position and provides a very convenient storage system. Furthermore, an aerodynamically efficient shape of the loaded trailer when the hulls are in the position is produced. Finally, the trailer arrangement is provided with a tent convertibility capability which takes advantage of existing outrigger structure constituted by the clamp arms 84. All of these advantages have been provided by a trailer construction which is relatively simple and inexpensive to manufacture and is relatively uncomplicated to use in the landing and launching operation and enables single handed launching operations as described. The storage arrangement is also well adapted to accommodate considerable additional stowage such as that required in camping and sailing such as foul weather gear, camping gear, sleeping bags, etc. yielding a quite self contained unit for sailing-camping outings.

The embodiments of the invention in which an exclusive property or privilege is claimed are defined as follows:

1. A boat trailer arrangement for one or more boats comprising a trailer frame adapted to be towed by a towing vehicle; a hull rest supported on said trailer frame having inclining inwardly extending surfaces, said hull rest including a hull rest means adapted to engage a boat hull and retain the same in a partially inverted position; means retaining said boat hull on said boat hull rest including a pair of spaced rigid clamp arms having a length in excess of the beam of the boat pivotally supported and adapted to be swung into engagement with the bottom of a boat hull resting in said hull rest; means releasably retaining each of said clamp arms in engagement with said boat hull bottom, including a corresponding clamp arm extension pivotally connected to the free end of each of said rigid clamp arms, each of said clamp arm extensions being of sufficient length to support said rigid clamping arm in a substantially horizontal position by pivoting movement into a vertical position, with the end thereof in engagement with the surface on which said boat trailer rests whereby said clamp arms may be swung into position to provide a support for said boat hull.

2. A boat trailer arrangement for transporting a pair of boat hulls in side by side relationship comprising a trailer frame; means for supporting said trailer frame to be towed by a towing vehicle; a pair of boat hull rests disposed on either side of the longitudinal axis of said boat trailer, said boat hull rests configured to support a pair of boat hulls in a partially inverted position inclined inwardly towards each other, with the length thereof extending along the longitudinal axis of said trailer; means for releasably retaining boat hulls disposed in said boat hull rests whereby said boat hulls in said position present an aerodynamically streamlined contour.

3. The boat trailer arrangement according to claim 2 wherein said means releasably retaining said boat hulls in said boat hull rests includes at least one clamp arm associated with each boat hull rest pivotally supported so as to be swung into position into engagement with the bottom portion of said boat hull and releasably retained in position in engagement therewith.

4. The boat trailer arrangement according to claim 3 wherein said means releasably retaining said clamp arms in engagement with said boat hull bottom comprises a clamp arm extension pivotally connected to each clamp arm and adapted to be swung into overlapping engagement with an opposing clamp arm extension member and means for securing together said overlapping extension members.

5. The boat trailer arrangement according to claim 4 wherein said at least one clamping arm associated with each respective boat hull rests comprises a pair of spaced clamp arms.

6. The boat trailer arrangement according to claim 4 further including a storage enclosure disposed between said inclined boat hull rests secured to said trailer frame.

7. The boat trailer arrangement according to claim 6 wherein said boat trailer arrangement further includes an elongated storage enclosure extending along the longitudinal axis of said boat trailer secured to said storage enclosure disposed between said boat hull rests, and extending forwardly parallel to said trailer longitudinal axis.

8. The boat trailer arrangement according to claim 5 wherein said clamp arms are supported on respective ends of at least one cross member extending transversely to the axis of said boat trailer secured thereto and wherein said clamp arm extension members are of a length equal to the height above the ground at which said cross members are supported whereby said clamp arms may be supported substantially horizontal to the ground by rotation of said extension members into engagement with the ground surface upon rotation of said clamp arms outwardly from said trailer to release said boat hull.

9. The boat trailer arrangement according to claim 5 wherein said means releasably retaining said extension members further comprises a locking mechanism adapted to draw together said clamp arms about their pivotal supports whereby said pair of boat hulls supposed in said boat hull rests may be drawn into firm engagement therewith.

10. The boat trailer arrangement according to claim 9 wherein said means releasably retaining said clamp arm extension members in engagement therewith further includes a pair of apertures formed in overlapping clamp arm extension members that are positioned to be aligned upon operation of said locking means and further including a locking member adapted to be disposed in said aligned apertures whereby a safety device is provided supplementing the locking means to prevent inadvertent separation of said clamp arm extension members.

11. The boat trailer arrangement according to claim 5 wherein said clamp arms are contoured on their inside edge in complementary fashion to the curvature of boat hulls and wherein said boat hull rests includes a pocket contoured to receive an edge of said boat hull.

12. The boat trailer arrangement according to claim 5 further including an elongated storage enclosure extending along the longitudinal axis of said trailer and positioned to receive said clamp arm extension members in said overlapping position.

13. The boat trailer arrangement according to claim 12 wherein said storage enclosure disposed between said boat hull rest support members comprises an A-frame enclosure and wherein said boat hull rest members are secured to inclined sides of said A-frame storage enclosure.

14. The boat trailer arrangement according to claim 5 wherein said a cross-bar arrangement is provided between said horizontally supported clamp arm, and further including a tent enclosure extending about said clamp arms having lower edges secured to said clamp arms and said cross member and further including a support pole supported centrally of said trailer frame said tent closure extending to said support pole and further including a floor support means extending between said clamp arms secured thereto whereby a tent enclosure is provided by said trailer arrangement.

15. The boat trailer arrangement according to claim 14 wherein said arrangement further includes a corner brace connected to said clamp arms at the outer extension thereof and engaging said tent enclosure.

16. A boat trailer arrangement comprising a trailer frame, a pair of road engaging wheels and means supporting said trailer frame on said wheels, a drawn bar member connected to said trailer frame and extending forwardly thereof; coupling means carried at the outer portion of said draw bar adapting said trailer to be coupled to a towing vehicle; an A-frame enclosure secured to said trailer frame located centrally on said boat trailer axis, said A-frame enclosure having a sloping side member inclined inwardly of said trailer axis; respective pairs of spaced boat hull rests secured to the sides of said A-frame enclosures, said boat hull rests also including boat hull retaining pockets formed at the lower outward portion thereof, respective pairs of clamp arm members; a pair of cross members secured to said A-frame enclosure at the front and rear sides thereof extending transversely to the boat trailer axis; means pivotally connecting one end of each of said clamp arms to an outer extremity of said cross-members, said clamp arms having concavely configured contours adapted to engage a boat hull disposed in said boat hull rest members upon swinging movement about said pivotal support into engagement with said boat hulls; means for releasably retaining said clamp arm members in engagement with a boat hull disposed in said respective boat hull rest members, said means including respective pairs of clamp arm extension members pivotally connected to the free end of said clamp arm members, said clamp arm extension members being of sufficient length to overlap said boat trailer axis of said A-frame enclosure, said clamp arm members positioned opposite each other whereby said clamp arm extension members may be overlapped with each other, means locking said overlapped clamp arm extension members together, an elongated storage compartment secured to said A-frame enclosure and positioned so that said clamp arm extension members overlap to the upper surface thereof, said elongated storage enclosure extending forward of said A-frame enclosure along the longitudinal axis of said trailer parallel to said draw bar.

17. The boat trailer arrangement according to claim 16 further including a strut member secured to said portion of said elongated storage member forward of said A-frame enclosure and secured at its outer end to the draw bar portion disposed beneath said point at which said strut member is secured.

18. The boat trailer arrangement according to claim 16 wherein said A-frame enclosure includes spaced apart A-frame end sections secured to said boat trailer frame and further including panel sections extending between said spaced apart A-frame end sections at the lower portions thereof and further including panel doors closing the remaining space above said panel sections extending beneath the lower portions thereof, said panel doors being pivotally mounted to said A-frame enclosure to be swung upwardly to allow access thereto.

19. The boat trailer arrangement according to claim 18 wherein said A-frame enclosure includes a central partition parallel to the longitudinal axis of said boat trailer means dividing the interior of said A-frame enclosure and further including mounting means affixed to said partition means providing storage support stowage mounting means for items to be stored in said A-frame enclosure.

* * * * *